United States Patent
Pesach

(10) Patent No.: US 7,077,565 B2
(45) Date of Patent: Jul. 18, 2006

(54) METHOD FOR MEASURING TEMPERATURE OF SUBSTANCES FROM MEASUREMENT OF ABSORPTION COEFFICIENTS

(75) Inventor: Benny Pesach, Rosh-Haayin (IL)

(73) Assignee: Glucon, Inc., Boulder, CO (US)

( * ) Notice: Subject to any disclaimer, the term of this patent is extended or adjusted under 35 U.S.C. 154(b) by 0 days.

(21) Appl. No.: 10/495,593

(22) PCT Filed: Nov. 14, 2002

(86) PCT No.: PCT/IL02/00914

§ 371 (c)(1),
(2), (4) Date: May 14, 2004

(87) PCT Pub. No.: WO03/048704

PCT Pub. Date: Jun. 12, 2003

(65) Prior Publication Data

US 2005/0083992 A1    Apr. 21, 2005

Related U.S. Application Data

(60) Provisional application No. 60/331,408, filed on Nov. 15, 2001.

(51) Int. Cl.
*G01K 11/18* (2006.01)
*G01J 3/28* (2006.01)
*A61B 5/145* (2006.01)
*A61B 5/01* (2006.01)

(52) U.S. Cl. ..................... 374/161; 374/120

(58) Field of Classification Search ................ 374/161
See application file for complete search history.

(56) References Cited

U.S. PATENT DOCUMENTS

| | | | |
|---|---|---|---|
| 4,873,481 A | 10/1989 | Nelson et al. | 324/640 |
| 4,973,853 A | 11/1990 | Leonard et al. | 250/559.4 |
| 5,348,396 A * | 9/1994 | O'Rourke et al. | 374/161 |
| 5,452,716 A | 9/1995 | Clift | 600/373 |
| 5,840,023 A | 11/1998 | Oraevsky et al. | 600/407 |
| 5,876,121 A * | 3/1999 | Burns et al. | 374/161 |
| 6,115,673 A | 9/2000 | Malin et al. | 702/23 |
| 6,116,779 A * | 9/2000 | Johnson et al. | 374/161 |
| 6,168,311 B1 | 1/2001 | Xiao et al. | 374/161 |
| 6,285,894 B1 | 9/2001 | Oppelt et al. | 600/323 |
| 6,846,288 B1 * | 1/2005 | Nagar et al. | 600/437 |
| 2004/0240512 A1* | 12/2004 | Pesach | 374/43 |
| 2005/0105095 A1* | 5/2005 | Pesach et al. | 356/432 |

FOREIGN PATENT DOCUMENTS

| | | | |
|---|---|---|---|
| WO | WO 99/19700 | * | 4/1999 |
| WO | WO 02/15776 | | 2/2002 |

* cited by examiner

*Primary Examiner*—Diego Gutierrez
*Assistant Examiner*—Stanley J. Pruchnic, Jr.
(74) *Attorney, Agent, or Firm*—Fenster & Company

(57) ABSTRACT

Determining the temperature of the water by measuring the absorption coefficient of water (32). The method for determining temperature of a first substance comprising: acquiring a measurement of the absorption coefficient of the first substance at least one wavelength (30); and determining the temperature using the measurement of the absorption coefficient and known values of the absorption coefficient as a function of temperature at the at least one wavelength.

36 Claims, 3 Drawing Sheets

US 7,077,565 B2

METHOD FOR MEASURING TEMPERATURE OF SUBSTANCES FROM MEASUREMENT OF ABSORPTION COEFFICIENTS

RELATED APPLICATIONS

The present application is a US National Phase of PCT Application No. PCT/IL02/00914, filed on Nov. 14, 2002, which claims the benefit under 35 U.S.C. 119(e) of U.S. Provisional Application 60/331,408 filed Nov. 15, 2001, the disclosure of which is incorporated herein by reference.

FIELD OF THE INVENTION

The invention relates to methods and apparatus for determining temperature and in particular to determining temperature of a material from measurements of the complex dielectric permittivity of the material.

BACKGROUND OF THE INVENTION

Temperature measurement is required by a wide range of activities and processes, and a large variety of devices are available for measuring temperature for different applications, temperature ranges and environmental conditions. Non-invasive devices for measuring temperature of a material usually measure temperature of the material at or near a surface of the material. Generally, measuring internal temperature of a material involves accessing an internal region of the material invasively and determining a temperature for the internal region. There is an ongoing need for new and alternative methods and devices for accurately measuring temperature conveniently and accurately.

It is well known that absorption of light by water is a function of temperature and that the shape of the optical absorption spectrum of water is a function of temperature. For example, U.S. Pat. No. 6,115,673, the disclosure of which is incorporated herein by reference, discusses how peaks in the water absorption spectrum centered at 2500 nm, 1950 nm and 1450 nm affect IR spectroscopy and how the positions of the centers of the peaks and magnitudes of the peaks change with temperature. The patent notes that the temperature dependence of the absorption spectrum "greatly hinders" near IR spectroscopy.

However, whereas, it is known that the absorption spectrum of water is dependent on temperature, it appears not to be known to determine temperature of materials comprising water by measuring the absorption spectrum of the water they comprise. Since, in general an absorption spectrum of a material is dependent upon many different components of the material, it may not have appeared to be practical to use absorption measurements of a single component, such as water comprised in the material to determine the material's temperature.

SUMMARY OF THE INVENTION

An aspect of some embodiments of the present invention relates to determining the temperature of water by measuring the absorption coefficient of water. In accordance with an embodiment of the present invention the absorption coefficient is measured at at least one wavelength and the measured absorption coefficient and its known dependence on temperature at the at least one wavelength are used to determine temperature of the water.

An aspect of some embodiments of the present invention relates to determining temperature of a fluid comprising water from a measurement of the absorption coefficient of the fluid.

According to an aspect of some embodiments of the present invention the at least one wavelength is a wavelength in a region, hereinafter referred to as a "water peak region", of the spectrum for which the absorption spectrum of water has a peak. The inventors have noted that at water peak regions, characteristics of the water absorption spectrum, such as amplitude of the spectrum and position of a peak therein, are relatively sensitive functions of temperature. A measurement of the absorption spectrum of water at at least one water peak wavelength is used, in accordance with an embodiment of the present invention, to determine at least one such temperature sensitive characteristic of the water absorption spectrum. The known dependence of the characteristic on temperature and the value of the characteristic determined from the measurement of the absorption coefficient are used to determine temperature of the water, in accordance with an embodiment of the present invention.

For many fluids comprising water, for example blood, the absorption spectrum of the fluids at a water peak region of the spectrum is so dominated by the absorption spectrum of water that the absorption spectrum of the fluids at the water peak region is substantially equal to the absorption spectrum of water. For such a fluid, at the water peak region, components of the fluid other than water do not substantially affect the absorption spectrum of the fluid. In accordance with an embodiment of the present invention, a measurement of the absorption coefficient of the fluid at at least one wavelength in the water peak region is used to determine a value for a temperature sensitive characteristic of the water absorption spectrum. The value so determined and the known dependence of the temperature sensitive characteristic on temperature is used to determine a temperature for the fluid.

There is therefore provided in accordance with an embodiment of the present invention, a method for determining temperature of a first substance comprising: acquiring a measurement of the absorption coefficient of the first substance at at least one wavelength; and determining the temperature using the measurement of the absorption coefficient and known values of the absorption coefficient as a function of temperature at the at least one wavelength.

Optionally, the at least one wavelength is a single wavelength.

Alternatively, the at least one wavelength is a plurality of wavelengths.

Optionally, determining temperature comprises determining to which particular curve of a plurality of curves the coefficient measurements best fit, wherein each of the plurality of curves describes dependence of the absorption coefficient of the first substance on wavelength for a different constant temperature and determining the temperature of the substance to be the constant temperature of the particular curve.

Optionally, determining a particular best fit curve comprises determining from the coefficient measurements a wavelength for which the absorption spectrum has a peak and determining which of the plurality of curves has a peak at substantially the same wavelength.

In some embodiments of the present invention, the first substance is a component of a second substance and wherein acquiring a measurement of the absorption coefficient at at least one wavelength comprises acquiring a measurement of the absorption coefficient of the second substance at at least one wavelength for which the absorption coefficient of the second substance is substantially equal to the absorption coefficient of the first substance.

In some embodiments of the present invention, the first substance is a component of a second substance and wherein acquiring a measurement of the absorption coefficient of the first substance at at least one wavelength comprises: acquiring first measurements of the absorption coefficient of the second substance at a plurality of wavelengths for which the absorption coefficients of the first substance and other components of the material are substantially independent of, or only weakly dependent on, temperature; determining concentrations of the first substance and the other components of the material from the acquired first measurements; acquiring a second measurement of the absorption coefficient of the second substance at at least one wavelength for which the absorption coefficient of the first substance is temperature dependent; determining the absorption coefficient for the first substance from the second measurement and the determined concentrations.

There is further provided, in accordance with an embodiment of the present invention a method for determining temperature of a first substance comprised in a second substance comprising: acquiring a measurement of the absorption coefficient of the second substance at a plurality of wavelengths in a wavelength region of the absorption spectrum of the second substance for which the shape of the wavelength and temperature dependence of the absorption spectrum of the second substance is substantially to the same as that of the absorption spectrum of the first substance; and determining the temperature using the measurement of the absorption coefficient and known values of the absorption coefficient of the first substance as a function of temperature at the plurality of wavelengths.

Optionally, determining temperature comprises determining to which particular curve of a plurality of curves the coefficient measurements best fit, wherein each of the plurality of curves describes dependence of the absorption coefficient of the first substance on wavelength for a different constant temperature and determining the temperature of the first substance to be the constant temperature of the particular curve.

Optionally, determining a particular best fit curve comprises determining from the coefficient measurements a wavelength for which the absorption spectrum has a peak and determining which of the plurality of curves has a peak at substantially the same wavelength.

Alternatively or additionally the method comprises using the measurement of the temperature of the first substance as the temperature of the second substance.

In some embodiments of the present invention, the second substance is a biological tissue. Optionally, the second substance is blood.

In some embodiments of the present invention, acquiring a measurement of an absorption coefficient comprises acquiring the measurement using a photoacoustic effect. Optionally, acquiring a measurement of an absorption coefficient comprises acquiring the measurement as a function of position. Optionally, determining temperature comprises determining temperature as a function of position.

In some embodiments of the present invention, the first substance is water. Optionally, a measurement of the absorption coefficient of is acquired at a wavelength or near to a wavelength for which the absorption coefficient of water has a peak. Additionally or alternatively, a measurement of the absorption coefficient is acquired at at least two wavelengths that straddle a wavelength at which the absorption coefficient peaks. Optionally the method comprises acquiring at least one measurement of the absorption coefficient at a wavelength substantially at the wavelength at which the absorption coefficient peaks.

BRIEF DESCRIPTION OF FIGURES

Non-limiting examples of embodiments of the present invention are described below with reference to figures attached hereto. In the figures, identical structures, elements or parts that appear in more than one figure are generally labeled with a same numeral in all the figures in which they appear. Dimensions of components and features shown in the figures are chosen for convenience and clarity of presentation and are not necessarily shown to scale. The figures are listed below.

DETAILED DESCRIPTION OF EXEMPLARY EMBODIMENTS

Figure 1:
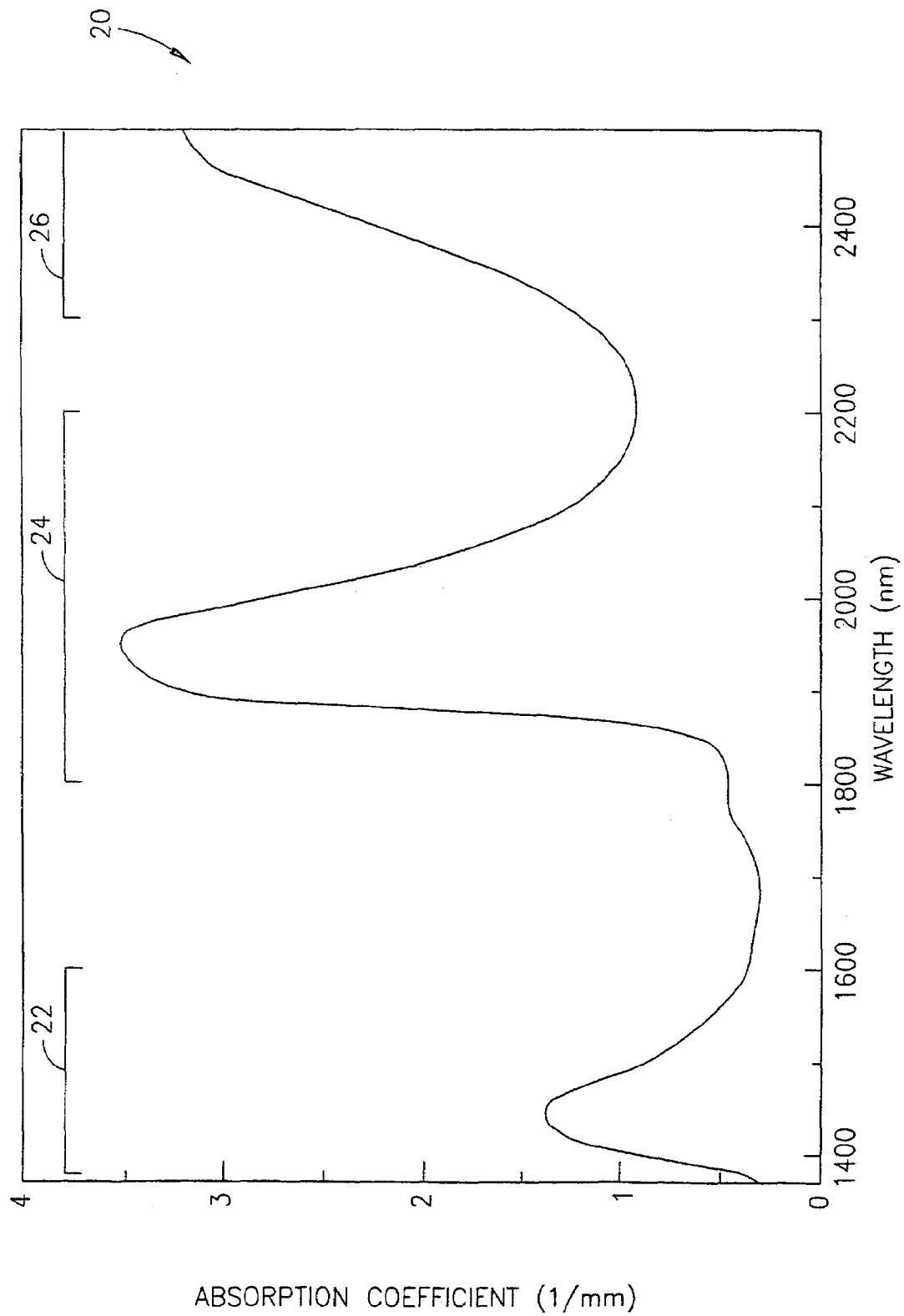
FIG. 1 shows a graph of the known absorption spectrum for water at 38.2° C.

FIG. 1 shows a graph 20 that graphs the absorption coefficient for water as a function of wavelength, i.e. the absorption spectrum for water, for a temperature of 38.2° C. Regions, i.e. water peak regions, of the spectrum, for which the absorption spectrum has peaks, are indicated by brackets 22, 24 and 26. Data for graph 20 is taken from a graph in FIG. 5a in U.S. Pat. No. 6,115,673 referenced above.

Figure 2:
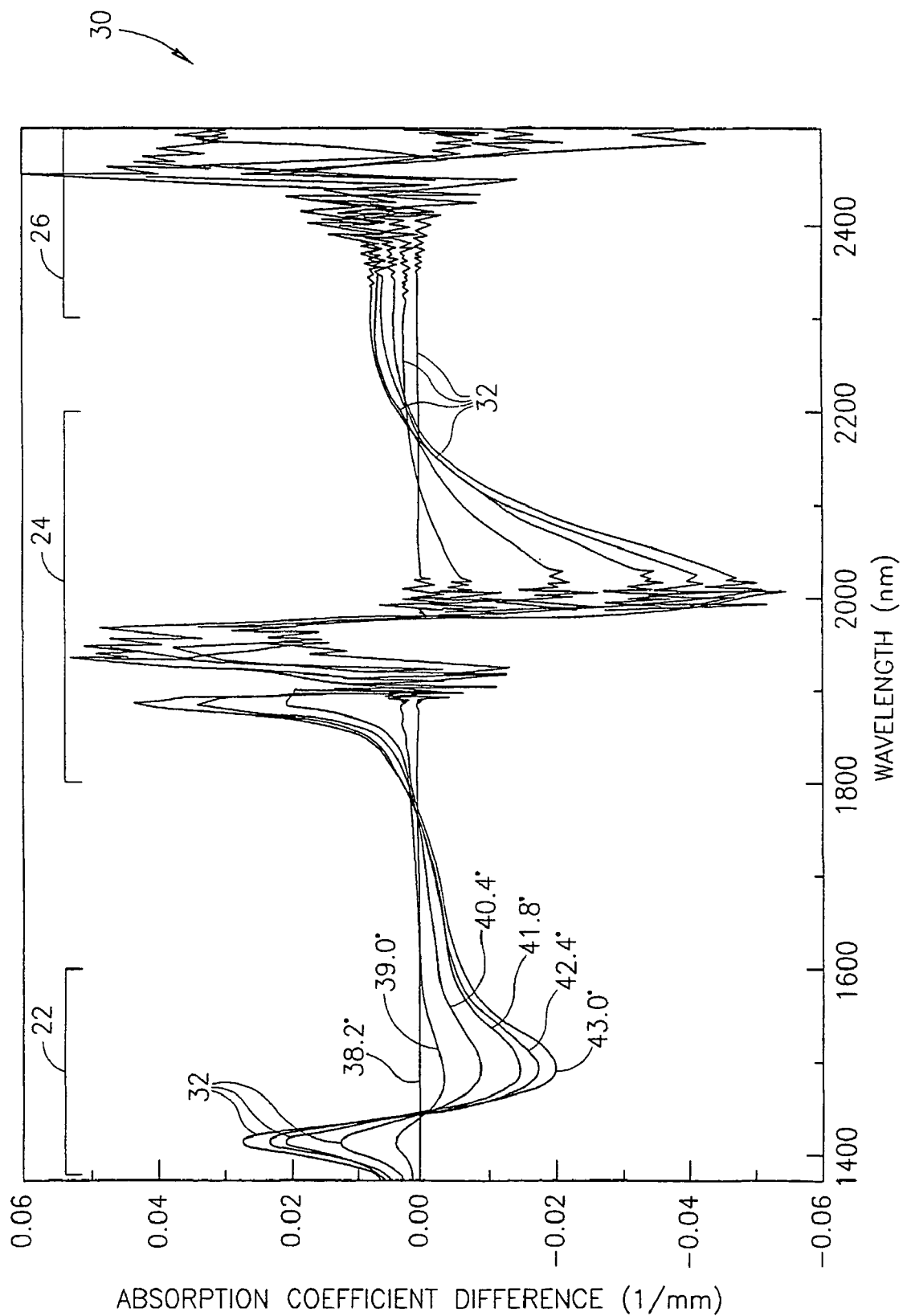
FIG. 2 shows a graph in which absorption spectra of water at different temperatures are graphed relative to the absorption spectrum for water at 38.2° C.

FIG. 2 shows a graph 30 in which absorption spectra of water at different temperatures are graphed by a set of curves 32 relative to the absorption spectrum for water at 38.2° C. Data for graph 30 is taken from a graph in FIG. 5b of U.S. Pat. No. 6,115,673. The Values of the absorption coefficient relative to the absorption coefficient at 38.2° C. as a function of wavelength at each of the different temperatures are indicated by a curve 32 labeled with the temperature. At each wavelength along the abscissa of graph 30 a value along the ordinate of the graph indicated by a curve 32 is a difference between the absorption coefficient for water at the temperature that labels the curve and the absorption coefficient of water at 38.2° C. The curve 32 for 38.2° C. is therefore a straight line parallel to the abscissa at an ordinate value equal to zero.

Curves 32 clearly indicate differences between the absorption spectra of water at different temperatures. In accordance with embodiments of the present invention, these differences are used to determine temperature of water.

For example, in some embodiments of the present invention, the absorption coefficient of a sample of water whose temperature is to be determined is measured at a plurality of different wavelengths in a water peak region of the spectrum. A best-fit curve is determined for the measurements using methods known in the art. The best-fit curve is compared using methods known in the art with known curves, each of which delineates the absorption spectrum of water in the water peak region for a different temperature, to determine a known curve that the best-fit curve most closely resembles. The temperature associated with the known curve 32 most resembling the best-fit curve is determined to be the temperature of the water sample. In some embodiments of the present invention, a measurement of the absorption coefficient of a sample of water at a single wavelength is used to determine temperature of the water sample.

Figure 3:
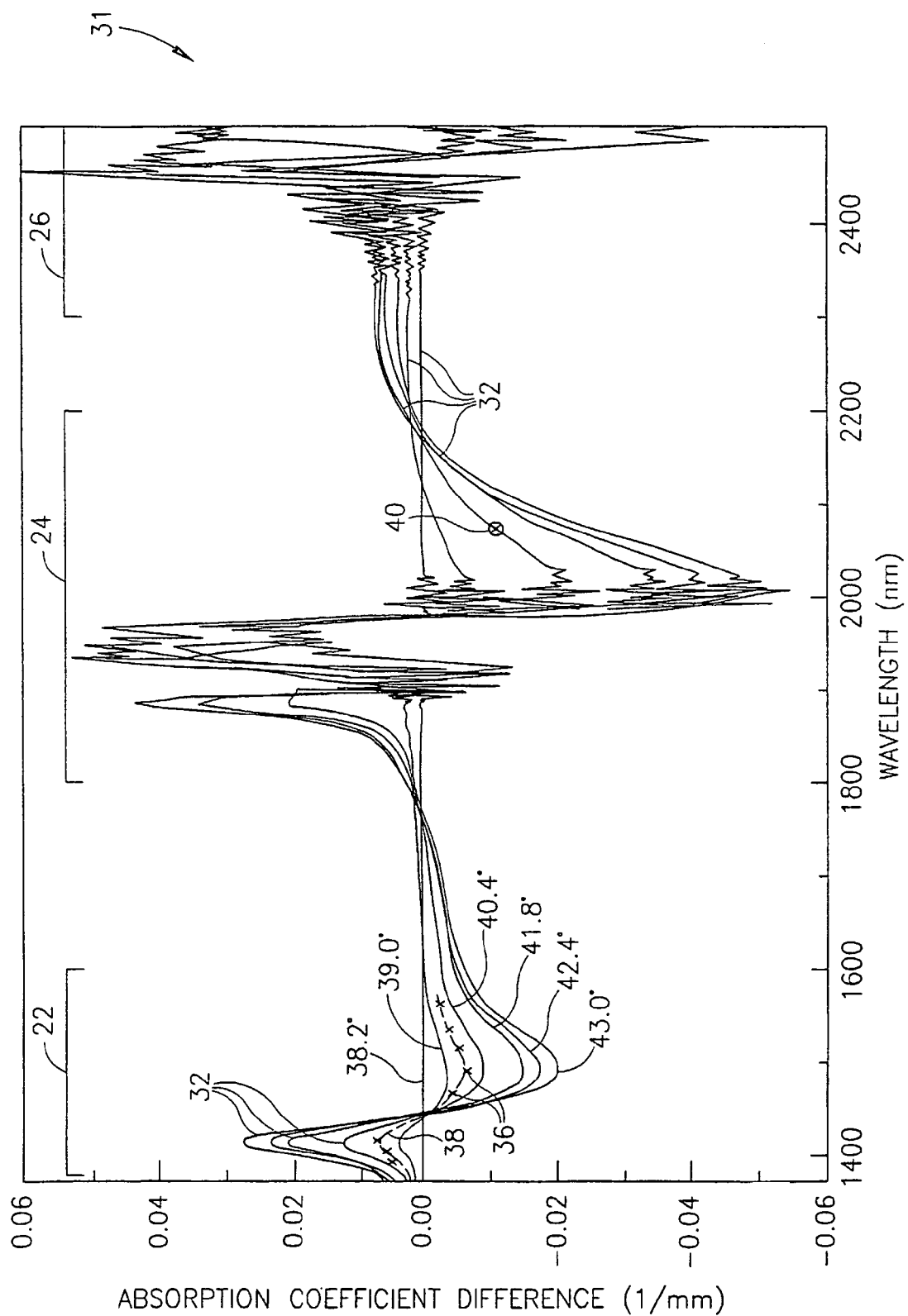
FIG. 3 shows a graph of simulated absorption coefficient measurements for water that are used to determine temperature of the water, in accordance with an embodiment of the present invention.

FIG. 3 graphically illustrates simulated absorption coefficient measurements acquired for samples of water that are used to determine temperature of the water samples, in accordance with an embodiment of the present invention.

FIG. 3 shows a graph 31 identical to graph 30, except that in addition to curves 32 shown in graph 30, graph 31 also shows differences between simulated measurements of the absorption coefficient of a first sample of water and the absorption coefficient of water at 38.2° C. at a plurality of different wavelengths in water peak region 22. Crosses 36 indicate values of the differences. A schematic best-fit curve 38 through values 36, shown by a dashed line, most closely resembles an absorption spectrum (not shown) of water for a temperature of 39.2° C. Temperature of the first water sample is therefore determined, in accordance with an embodiment of the present invention, to be 39.2° C.

A value, for a simulated measurement of the absorption coefficient for a second sample of water acquired at a wavelength of 2050 nm in water peak region 24 relative to the absorption coefficient of water at 2050 nm and 38.2° C. is indicated by a circled cross 40. By way of example, circled cross 40 lies on curve 32 that delineates the absorption spectrum for water at 40.4° C. The temperature of the second sample of water is therefore determined, in accordance with an embodiment of the present invention, to be equal to 40.4° C.

For some fluids comprising water, the absorption coefficient of the fluid at a given wavelength in some regions, hereinafter "isomorphic regions", of the spectrum may be substantially equal to the absorption coefficient of water at the given wavelength. In some embodiments of the present invention, temperature of such a fluid is determined from a measurement of the absorption coefficient of the fluid at at least one wavelength in an isomorphic region of the spectrum. The measurement of the absorption coefficient of the fluid at the at least one wavelength is assumed to provide a value for the absorption coefficient of water comprised in the fluid at the wavelength. The value for the provided absorption coefficient of water is used, employing a method similar to a method described above, to determine a temperature for the water comprised in the fluid and thereby for the fluid.

For some fluids comprising water for which the absorption spectrum of water dominates the absorption spectrum of the fluid, the water absorption spectrum does not sufficiently dominate so that a measurement of the absorption coefficient of the fluid can be assumed to be a measurement of the absorption coefficient for the water. As a result, measurements of the absorption coefficient of the fluid cannot be directly used to determine the temperature of the water in the fluid and thereby the temperature of the fluid.

For such cases, in accordance with an embodiment of the present invention, measurements of the absorption coefficient of the fluid are acquired at a plurality of suitable wavelengths for which the absorption coefficients of water and the other components are preferably substantially independent of, or only weakly dependent on, temperature. The measurements are used to assay water and the other components of the fluid. Methods for assaying components of a liquid from absorption coefficient measurements are well known and are described for example, in U.S. Pat. No. 5,452,716 to V. Clift, U.S. Pat. No. 6,846,288 to Nagar, et al., the disclosures of which are incorporated herein by reference, and in U.S. Pat. No. 6,115,673 referenced above.

Concentration of water and concentration of the other components determined from the assay and dependence of their absorption spectra on temperature are used to extract a value for the absorption coefficient of water from a measurement, at a suitable wavelength, of the absorption coefficient of the fluid. In accordance with an embodiment of the present invention, the "extracted" absorption coefficient of water is used, employing methods similar to those described above, to determine temperature of the water and the fluid.

Absorption coefficient measurements for determining temperature, in accordance with an embodiment of the present invention, may be acquired using any of various methods known in the art. In some embodiments of the present invention, absorption coefficient measurements are acquired using method described in US2005-0105095-A1 the disclosures of which is incorporated herein by reference and in U.S. Pat. No. 6,846,288.

U.S. Pat. No. 6,846,288 describes, inter alia, using photoacoustic methods for determining an absorption coefficient of a material. Such photoacoustic methods can be used to determine the absorption coefficient of a material as a function of position in the material. For example, U.S. Pat. No. 5,840,023, the disclosure of which is incorporated herein by reference, and U.S. Pat. No. 6,846,288 describe using the photoacoustic effect for generating three dimensional images of a tissue region. In accordance with an embodiment of the present invention, values for the absorption coefficient of water as a function of position determined using photoacoustic techniques are used to determine temperature of the water as a function of position in the water.

It is noted that photoacoustic methods of measuring the absorption coefficient of water are useable in situations for which the absorption coefficient is large (e.g. at absorption peaks of water at 1450 nm or 1950 nm) and measurements of the absorption coefficient of a sample volume of water by transmission become unreliable because amounts of light transmitted through the volume are small. Signals generated by the photoacoustic effect increase as the absorption coefficient increases.

In accordance with embodiments of the present invention, methods of determining temperature described above are used to determine temperature of blood.

Methods for determining temperature in accordance with embodiments of the present invention described above are not limited to use with water and fluids comprising water. The methods and/or variations thereof that will occur to a person of the art are applicable to other substances for which the absorption spectrum of the substance is suitably dependent on temperature.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for determining temperature of a first substance that is a component of a second substance, the method comprising:

acquiring a measurement of the absorption coefficient of the second substance at at least one wavelength for which the absorption coefficient of the second substance is substantially equal to the absorption coefficient of the first substance; and determining the temperature of the first substance using the measurement of the absorption coefficient and known values of the absorption coefficient of the first substance as a function of temperature at the at least one wavelength.

2. A method according to claim 1 wherein the at least one wavelength is a single wavelength.

3. A method according to claim 2 wherein the first substance is water.

4. A method according to claim 1 wherein the at least one wavelength is a plurality of wavelengths.

5. A method according to claim 4 wherein determining temperature comprises determining to which particular curve of a plurality of curves the coefficient measurements best fit, wherein each of the plurality of curves describes dependence of the absorption coefficient of the first substance on wavelength for a different constant temperature and determining the temperature of the substance to be the constant temperature of the particular curve.

6. A method according to claim 5 wherein the first substance is water.

7. A method according to claim 5 wherein determining a particular best fit curve comprises determining from the coefficient measurements a wavelength for which the absorption spectrum has a peak and determining which of the plurality of curves has a peak at substantially the same wavelength.

8. A method according to claim 7 wherein the first substance is water.

9. A method according to claim 8 wherein a measurement of the absorption coefficient is acquired at a wavelength or near to a wavelength for which the absorption coefficient of water has a peak.

10. A method according to claim 9 wherein a measurement of the absorption coefficient is acquired at at least two wavelengths that straddle a wavelength at which the absorption coefficient peaks.

11. A method according to claim 1 wherein the first substance is water.

12. A method according to claim 1 and comprising using the measurement of the temperature of the first substance as the temperature of the second substance.

13. A method according any of claims 12 wherein the second substance is a biological tissue.

14. A method according to claim 13 wherein the second substance is blood.

15. A method according to claim 1 wherein acquiring a measurement of an absorption coefficient comprises acquiring the measurement using a photoacoustic effect.

16. A method according to claim 15 wherein acquiring a measurement of an absorption coefficient comprises acquiring the measurement as a function of position.

17. A method according to claim 16 wherein determining temperature comprises determining temperature as a function of position.

18. A method for determining temperature of a first substance that is a component of a second substance the method comprising:

acquiring first measurements of the absorption coefficient of the second substance at a plurality of wavelengths for which the absorption coefficients of the first substance and other components of the material are substantially independent of, or only weakly dependent on, temperature;

determining concentrations of the first substance and the other components of the material from the acquired first measurements;

acquiring a second measurement of the absorption coefficient of the second substance at at least one wavelength for which the absorption coefficient of the first substance is temperature dependent;

determining the absorption coefficient for the first substance from the second measurement and the determined concentrations; and determining the temperature using the determined absorption coefficient for the first substance and known values of the absorption coefficient of the first substance as a function of temperature at the at least one wavelength.

19. A method according to claim 18 and comprising using the measurement of the temperature of the first substance as the temperature of the second substance.

20. A method according to claim 19 wherein the second substance is a biological tissue.

21. A method according to claim 20 wherein the second substance is blood.

22. A method for determining temperature of a first substance comprised in a second substance comprising:

acquiring a measurement of the absorption coefficient of the second substance at a plurality of wavelengths in a wavelength region of the absorption spectrum of the second substance for which the shape of the wavelength and temperature dependence of the absorption spectrum of the second substance is substantially the same as that of the absorption spectrum of the first substance; and determining the temperature using the measurement of the absorption coefficient and known values of the absorption coefficient of the first substance as a function of temperature at the plurality of wavelengths.

23. A method according to claim 22 wherein determining temperature comprises determining to which particular curve of a plurality of curves the coefficient measurements best fit, wherein each of the plurality of curves describes dependence of the absorption coefficient of the first substance on wavelength for a different constant temperature and determining the temperature of the first substance to be the constant temperature of the particular curve.

24. A method according to claim 23 wherein determining a particular best fit curve comprises determining from the coefficient measurements a wavelength for which the absorption spectrum has a peak and determining which of the plurality of curves has a peak at substantially the same wavelength.

25. A method according to claim 22 wherein the first substance is water.

26. A method according to claim 25 wherein a measurement of the absorption coefficient is acquired at a wavelength or near to a wavelength for which the absorption coefficient of water has a peak.

27. A method according to claim 26 wherein a measurement of the absorption coefficient is acquired at at least two wavelengths that straddle a wavelength at which the absorption coefficient peaks.

28. A method according to claim 25 and comprising using the measurement of the temperature of the water as the temperature of the second substance.

29. A method according to claim 28 wherein the second substance is a biological tissue.

30. A method according to claim 29 wherein the second substance is blood.

31. A method according to claim 22 and comprising using the measurement of the temperature of the first substance as the temperature of the second substance.

32. A method according any of claim 31 wherein the second substance is a biological tissue.

33. A method according to claim 32 wherein the second substance is blood.

34. A method according to claim 22 wherein acquiring a measurement of an absorption coefficient comprises acquiring the measurement using a photoacoustic effect.

35. A method according to claim 34 wherein acquiring a measurement of an absorption coefficient comprises acquiring the measurement as a function of position.

36. A method according to claim 35 wherein determining temperature comprises determining temperature as a function of position.

* * * * *